United States Patent Office 3,226,452
Patented Dec. 28, 1965

3,226,452
ALPHA-PINENE MODIFIED POLYESTER RESINS
Anthony R. Manyak, Pompton Plains, and Thaddeus J. Czarnomski, Scotch Plains, N.J., assignors, by mesne assignments, to W. R. Grace & Co., New York, N.Y., a corporation of Connecticut
No Drawing. Filed Dec. 12, 1962, Ser. No. 244,219
3 Claims. (Cl. 260—871)

This invention relates to polyester resin compositions incorporating the use of a polymerizable adduct of an alpha-beta ethylenically unsaturated dicarboxylic acid or anhydride an alpha-pinene.

It is believed that the adduct is substantially the Diels-Alder reaction product of alpha-terpinene and the unsaturated dicarboxylic acid; the alpha-terpinene being formed by the rearrangement of alpha-pinene in the presence of heat. The presence of water, which appears to play the role of a catalyst, greatly aids in this rearrangement.

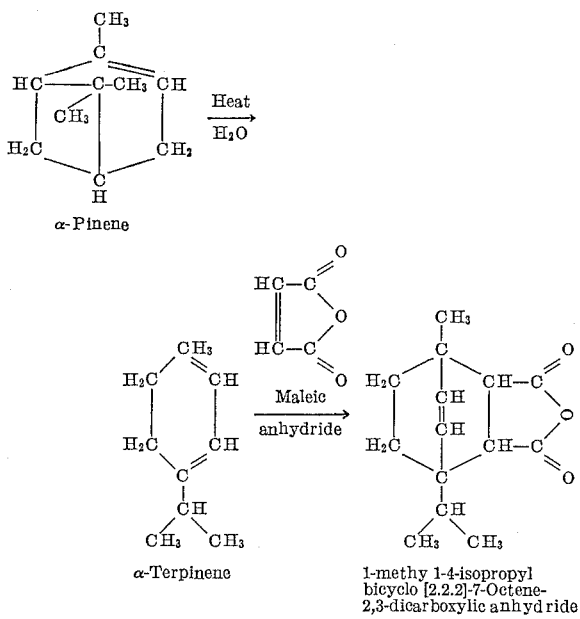

The adduct could also be formed by the Diels-Alder reaction of alpha-terpinene and either the half ester or partially esterified product of the dicarboxylic acid and a dihydric alcohol. Further, the adduct could be formed by the alpha-terpinene and fully esterified unsaturated alkyd which is produced from the dicarboxylic acid and a dihydric alcohol.

It is essential, therefore, that in preparing the polyester containing the adduct, sufficient unreacted double bonds of the dicarboxylic acid are available for subsequent cross linking with any desired copolymerized vinyl monomer. To so provide, it is necessary that the proportions of the alpha-pinene to the alpha-beta ethylenically unsaturated dicarboxylic acid be less than that equivalent to a 1:1 mol ratio. The amount of alpha-pinene, thus should be from about 1/20 to 19/20 mole per mole of alpha-beta ethylenically unsaturated dicarboxylic acid used.

The preparation of the adduct can be accomplished by either one of the following procedures.

In the preparation of the unsaturated alkyd prior to the adduct formation, the glycol (e.g., ethylene glycol, propylene glycol, diethylene glycol, dipropylene glycol, triethylene glycol, butane-1,2 diol, butane-1,3 diol, butane-1,4 diol, pentane-1,2 diol, pentane-1,3 diol, pentane 1,4 diol, pentane 1,5 diol, and the like or mixtures thereof. Additionally one could use glycerol, trimethylolpropane, pentaerythritol, dipentaerythritol, polyethylene glycol, 2-butene-1,4 diol and the like), the alpha-beta ethylenically unsaturated dicarboxylic acid or anhydride (e.g., maleic, fumaric, citraconic, itaconic, aconitic, mesaconic, chloromaleic, carbic and the like or mixtures thereof) and acids free of non-benzenoid unsaturation (e.g., phthalic, isophthalic, terephthalic, oxalic, malonic, succinic, glutaric, sebacic, adipic, pimelic, suberic, azelaic, tricarballylic, citric, tartaric, malic, oleic, linoleic, palmitic and the like or mixtures thereof) are condensed to a polyester at about 200–215° C., for example, until reaction is substantially complete. The mixture is then cooled to 150° C. and the alpha-pinene added. The mixture is then reheated to approximately 185–200° C. and held until the adduct has formed. In preparing the adduct from either the half ester or partially esterified product the glycol, alpha-beta ethylenically unsaturated dicarboxylic and acids free of non-benzenoid unsaturation are heated at 175 to 185° C. for one hour. The mixture is then cooled to 150° C., the alpha-pinene added followed by reheating to 195–210° C. and held at this temperature until both adduct formation and polyester formation are substantially complete. In preparing the adduct prior to any polyester formation, the alpha-pinene and the alpha-beta ethylenically unsaturated dicarboxylic acid are heated slowly to 180° C. and held at this temperature for 1–2 hours or until the reaction is complete. The mixture is cooled to 125–130° C. and the glycol and acids free of non-benzenoid unsaturation are added. The temperature of the mixture is slowly raised to 200–210° C. and held until esterification is essentially complete.

After cooling the adduct modified polyester, the resin is mixed with styrene or any other desired copolymerizable vinyl monomer along with an inhibitor of polymerization, thereby forming a polymerizable liquid resin encompassing the alpha-pinene modified alkyd.

Although the preferred vinyl monomer is styrene others such as vinyl toluene, alpha methyl styrene, vinyl acetate, butyl acrylate, methyl methacrylate, vinyl naphthalene, diallyl phthalate or any other of a myriad of other crosslinking materials comprising one or more monomers containing a $CH_2=C<$ group could be used. Although a monomer content ranging from 5% to 95% would be satisfactory a range of from 20% to 60% is preferred.

The inhibitor of polymerization or resin stabilizer may be any one of the following: quinone, hydroquinone, pyrocatechol, tertiary butyl catechol, resorcinol, 1,4-naphthoquinone, tertiary butyl hydroquinone, aniline or the like.

As an optional ingredient an ultraviolet light absorbent may be included in the amount ranging from about 0.1% to about 2.0% or more based on the total weight of polymerizable matter, with 0.15% to 1.0% being the preferred range. This additive is added to eliminate or minimize yellowing in the case of light colored products but would probably be unnecessary for dark colored resin formulations. Any light stabilizer compatible with unsaturated polyester resins may be employed. These include classes of substituted benzophenones, benzotriazoles and like compounds.

One of the outstanding properties of the alpha-pinene modified alkyl of this invention is that when copolymerized with a copolymerizable vinyl monomer such as styrene in the presence of a medium or high temperature peroxide such as t-butyl perbenzoate under heat and presure conditions as encountered in matched die molding of premix resin formulations, the molded parts builds up to its maximum hardness at a much faster rate than a conventional resin comprised only of glycol and an alpha-beta ethylenically unsaturated acid designed for this application. This is illustrated below.

PREMIX RESIN FORMULATIONS CURED AT 300–310° F.

| Resin | Alpha-pinene modified | Alpha-pinene modified | Conventional pre-mix |
|---|---|---|---|
| Catalyst, percent: | | | |
| Benzoyl peroxide | 1 | .5 | .5 |
| T-butyl perbenzoate | 0 | .5 | .5 |

BARCOL HARDNESS OF MOLDED PART AFTER REMOVAL FROM PRESS

| Minutes | 1 | 5 | 15 | 1 | 5 | 15 | 1 | 5 | 15 |
|---|---|---|---|---|---|---|---|---|---|
| Dwell time: | | | | | | | | | |
| 2 minutes | 0 | 5–22 | 25 | 25–30 | 45–55 | 50–60 | 0–9 | 35–40 | 45–50 |
| 1 minute | | | | 20–30 | 45–50 | 55–60 | 5–15 | 40–45 | 50–55 |
| 45 seconds | | | | 25–35 | 45–54 | 55–60 | 0–8 | 25–35 | 45–50 |
| 30 seconds | | | | 20–25 | 45–50 | 50–58 | 0–5 | 30–40 | 45–50 |

In view of the above results it is believed that under conditions of heat and in the presence of a medium or high temperature catalyst the double bond in the cyclohexene ring resulting from the Diels-Alder reaction becomes reactive and also copolymerizes with the copolymerizable vinyl monomer resulting in additional cross-linking and consequently a faster hardness buildup of the alpha-pinene modified resin.

In Examples 1 through 6 giben below the esterification is unusually rapid, because, once the alpha-pinene has been added and the temperature raised, any unreasted alpha-pinene aids in driving out traces of water during the later stages of the reaction and thereby shortens the reaction cycle considerably.

Having thus described our invention, in order to more fully illustrate the manner in which the invention may be carried out, the following examples are given. It should be understood, however, that the examples presented are for the purpose of illustration only and the invention is not to be regarded as limited to any of the specific materials or conditions stated therein. In the following illustrative examples all proportions are set forth in terms of weight unless otherwise noted.

*Example 1*

A five liter four-necked flask equipped with stirrer, dropping funnel, gas inlet tube and a 6 bulb Snyder distilling column was charged with 1598 g. of propylene glycol and 1961 g. of maleic anhydride. A low sparge with carbon dioxide was begun. Heat was applied and the mixture heated to 90° C. at which time the heat was cut off and the material allowed to exotherm. The mixture was maintained at 170–175° C. for 1 hour after which the temperature was lowered to 155° C. At 155° C. the Snyder distilling column was replaced by a Dean-Stark water trap fitted with a cold water condenser. While maintaining the temperature of the contents of the flask at 145–155° C., 680 g. of alpha-pinene were added over a period of approximately ½ hour. The temperature was increased to 195–200° C. and maintained until an "X" Gardner-Holdt viscosity at 70% N.V. in styrene was reached. During the reaction any unreached alpha-pinene was recycled back into the flask and the water drawn off continuously. The finished alkyd was inhibited with 0.424 g. of hydroquinone and then cooled to 105° C. at which temperature it was diluted with 1630 g. of styrene containing 0.271 g. tertiary butyl catechol. After cooling to room temperature the liquid resin was poured into containers.

*Example 2*

This example is the same as Example 1 with the exception 1672 g. propylene glycol, 2072 g. maleic anhydride and 952 g. alpha-pinene were used. 4200 g. of the finished alkyd containing .47 g. of hydroquinone were thinned with 1800 g. of styrene containing 0.3 g. tertiary butyl catechol, cooled to room temperature and poured into containers.

*Example 3*

This example is the same as Example 1 except that 1435 g. propylene glycol, 1765 g. maleic anhydride and 1224 g. alpha-pinene were used. 3600 g. of finished alkyd was inhibited with .443 g. of hydroquinone, cooled to 105° C. and diluted with 1780 g. styrene containing .269 g. tertiary butyl catechol.

Examples 1, 2 and 3 illustrate the use of higher ratios of alpha-pinene to maleic anhydride. The effect of going to a higher ratio of adduct to maleic unsaturation is illustrated in the SPI data given below.

| Example No | 1 | 2 | 3 |
|---|---|---|---|
| Ratio: Moles maleic unsaturation/Moles adduct | 3/1 | 2/1 | 1/1 |
| SPI Gel | 4′25″ | 4′45″ | 4′15″ |
| SPI Cure | 1′50″ | 2′30″ | 2′50″ |
| SPI P.E., °F | 414 | 370 | 353 |

*Example 4*

This example is the same as Example 1 except the temperature of the mixture was lowered to 150° C. immediately after the reaction had exothermed instead of holding at 170–175° C. for 1 hour prior to the addition of the alpha-pinene.

*Example 5*

This example is the same as Example 1 with the exception that 2229 g. diethylene glycol were substituted for the propylene glycol. 4410 g. alkyd were inhibited with .487 g. hydroquinone, cooled to 105° C. and diluted with 2400 g. styrene contatining .34 g. tertiary butyl catechol.

*Example 6*

A 100 gallon stainless steel kettle equipped with stirrer, overhead and horizontal condensers, gas inlet tube, water trap and addition funnel was charged with 228 lbs. of propylene glycol and 280 lbs. maleic anhydride. A low sparge of carbon dioxide was begun and heat was applied. At 90° C. the heat was shut off and the reaction allowed to exotherm. The batch was then maintained at 165–170° C. for one hour after which the kettle temperature was lowered to 150° C. While maintaining the temperature at 145–150° C., 97 lbs. of alpha-pinene were added over a period of 30–45 minutes. The temperature of the kettle was then increased at the rate of 15° C./hour to 195° C. at which time 13.7 g. hydroquinone were added. The temperature of the kettle was maintained at 195–200° C. until the mixture had reached a Gardner-Holdt "X" viscosity diluted 70/30 in styrene. Throughout the reaction any unreacted alpha-pinene in the distillate was recycled to the kettle while the water was continuously drawn off and discarded.

Upon reaching the desired viscosity 27.5 g. of hydroquinone were added to the alkyd and mixed for 10 minutes. The alkyd was pumped over into a carbon dioxide purged blending tank and cooled to 95° C. at which time it was diluted with 235 lbs. of styrene containing 17.7 g. tertiary butyl catechol. The resin was then cooled to 30° C. and pumped into 55 gallon drums for storage.

A comparison of 3 pilot plant runs are given below:

| Run No. | 1 | 2 | 3 |
|---|---|---|---|
| Total reaction time, hrs | 11½ | 10½ | 13 |
| Viscosity, cps. at 25° C | 2,080 | 2,040 | 2,200 |
| Acid No | 27.3 | 37.0 | 37.2 |
| Color, APHA | 105 | 65 | 65 |
| SPI gel | 4′45″ | 5′ | 5′ |
| SPI cure | 1′45″ | 2′ | 2′ |
| SPI P.E., ° F | 410 | 416 | 420 |

The foregoing 6 examples are examples of forming the alpha-pinene adduct from either the half ester or partially formed polyester of a glycol and an alpha-beta ethylenically unsaturated dicarboxylic acid.

Example 7

To a five liter four-necked flask equipped with a stirrer, gas inlet tube and a reflux condenser was charged 1961 g. of maleic anhydride and 680 g. of alpha-pinene. A carbon dioxide blanket was maintained over the mixture. Heat was applied and the mixture heated to 180° C. and held at this temperature for one hour. Since there was practically no reflux after 1 hour at 180° C., which is well above the established boiling point range of alpha-pinene (156–159° C.), it was assumed that adduct formation had taken place. The mixture was then cooled to 110° C., the flask was fitted with a Dean-Stark water trap and condenser and 800 g. of propylene glycol added. The mixture was brought to 170° C. and the remaining 798 gms. of propylene glycol were then added over a period of 1 hour. The temperature was raised to 195–200° C. and held until an "X" Gardner-Holdt viscosity at 70% N.V. in styrene had been reached. At this time .424 g. of hydroquinone were added to the alkyd. The alkyd was cooled to 105° C. and diluted with 1600 g. of styrene containing .265 g. tertiary butyl catechol. After cooling to room temperature the liquid resin was poured into containers.

The above example is one in which the alpha-pinene maleic anhydride adduct was formed prior to esterification with the glycol.

Example 8

To a 5 liter four necked flask equipped with a stirrer, dropping funnel, gas inlet tube and a 6 bulb Snyder distilling column was charged 1598 g. of propylene glycol and 1961 g. maleic anhydride. A low sparge with carbon dioxide was begun and heat was applied until the mixture reached 90° C. at which time the heat was turned off and the reaction allowed to exotherm. The temperature was then raised gradually to 200° C. and held until the esterification was essentially complete. The alkyd was then cooled to 150° C. The Snyder distilling column was replaced by a Dean-Stark water trap fitted with a cold water condenser. Then, while maintaining the flask at 145–150° C., 680 g. of alpha-pinene were added over a period of 5–10 minutes. The temperature was raised to 185–190° C. and held until the adduct formation was complete. During the reaction any alpha-pinene in the distillate was allowed to recycle back to the reaction flask and any water was continuously drawn off and discarded. On completion of the reaction .424 g. of hydroquinone was added to the alkyd which was then cooled to 105° C. 3500 g. of alkyd were diluted with 1500 g. of styrene containing .25 g. tertiary butyl catechol. After further cooling to room temperature the liquid resin was poured into containers.

This example illustrates the method of first forming the complete polyester followed by the adduct formation with alpha-pinene.

SPI data on three identical resin formulations prepared via the different routes mentioned in Examples #1, #7, and #8 are given below. This data indicates that regardless of the route taken the finished resins are very similar in behavior.

| Example No. | 1 | 7 | 8 |
|---|---|---|---|
| SPI gel | 4′25″ | 3′50″ | 4′25″ |
| SPI cure | 1′50″ | 1′40″ | 1′43″ |
| SPI P.E., ° F | 414 | 429 | 432 |

Although many of the examples cited in this application refer to rigid polyester resins such as are used to make molded articles, a wide range of resins from very flexible to very rigid can and have been made by varying the ratio of alpha-pinene to alpha-beta ethylenically unsaturated dicarboxylic acid or anhydride, by varying the dihydric alcohol or using mixtures of dihydric alcohols, or by introducing acids or acid anhydrides free of non-benzenoid unsaturation into the resin composition. An example of a quite flexible resin is described below.

Example 9

A 5 liter four necked flask equipped with a stirrer, dropping funnel, a gas inlet tube and a 6 bulb Snyder distilling column was charged with 2043 g. diethylene glycol, 1544 g. maleic anhydride and 256 g. adipic acid. A low sparge with carbon dioxide was begun and heat was applied until the reaction mixture reached 175° C. The temperature was maintained at 170–180° C. for 1 hour after which the heat was turned off and the temperature allowed to fall to 150° C. The Snyder distilling column was replaced by a Dean-Snyder water trap fitted with a condenser. While maintaining the temperature at 145–150° C., 952 g. of alpha-pinene were added over a period of ½ hour. The temperature was then raised to 200° C. and held until the reaction was essentially complete. During the course of the reaction any alpha-pinene in the distillate was recycled back into the reaction flask and the water was continuously drawn off. Upon completion of the reaction 0.48 g. of hydroquinone were added to the alkyd and mixed for 10 minutes. The alkyd was then cooled to 105° C. and diluted with 1800 g. of styrene containing 0.3 g. tertiary butyl catechol. The liquid resin was cooled to room temperature and poured into containers.

What we claim is:
1. A polymerizable composition comprising:
   (1) a polyester resin consisting essentially of a Diels-Alder reaction product of alpha-pinene and a polyester resin comprised of a glycol and an alpha-beta ethylenically unsaturated dicarboxylic acid in which resin the proportion of alpha-pinene ranges from ½₀ to 19⁄20 mole for each mole of alpha-beta ethylenically unsaturated acid constituent of the polyester, the said reaction product containing double bonds attributable to alpha-beta ethylenically unsaturated acid groups not reacted with alpha-pinene, and,
(2) a vinyl monomer selected from the group consisting of styrene, vinyl toluene, alpha methyl styrene, vinyl acetate, butyl acrylate, methyl methacrylate, vinyl naphthalene, diallyl phthalate, and mixtures thereof.

2. The composition of claim 1 wherein the vinyl monomer is styrene.

3. A resinous copolymer prepared by polymerizing the composition of claim 1.

References Cited by the Examiner

UNITED STATES PATENTS

| | | | |
|---|---|---|---|
| 2,253,681 | 8/1941 | Bradley et al. | 260—75 |
| 2,777,828 | 1/1957 | Day et al. | 260—866 |
| 2,973,332 | 2/1961 | Finkentscher et al. | 260—75 |

FOREIGN PATENTS 599,521  6/1960  Canada.

MURRAY TILLMAN, *Primary Examiner.*

JOHN T. GOOLKASIAN, *Assistant Examiner.*